Feb. 4, 1958 J. A. MOOSMAN 2,821,766
SAFETY CATCH
Filed May 7, 1953 2 Sheets-Sheet 1
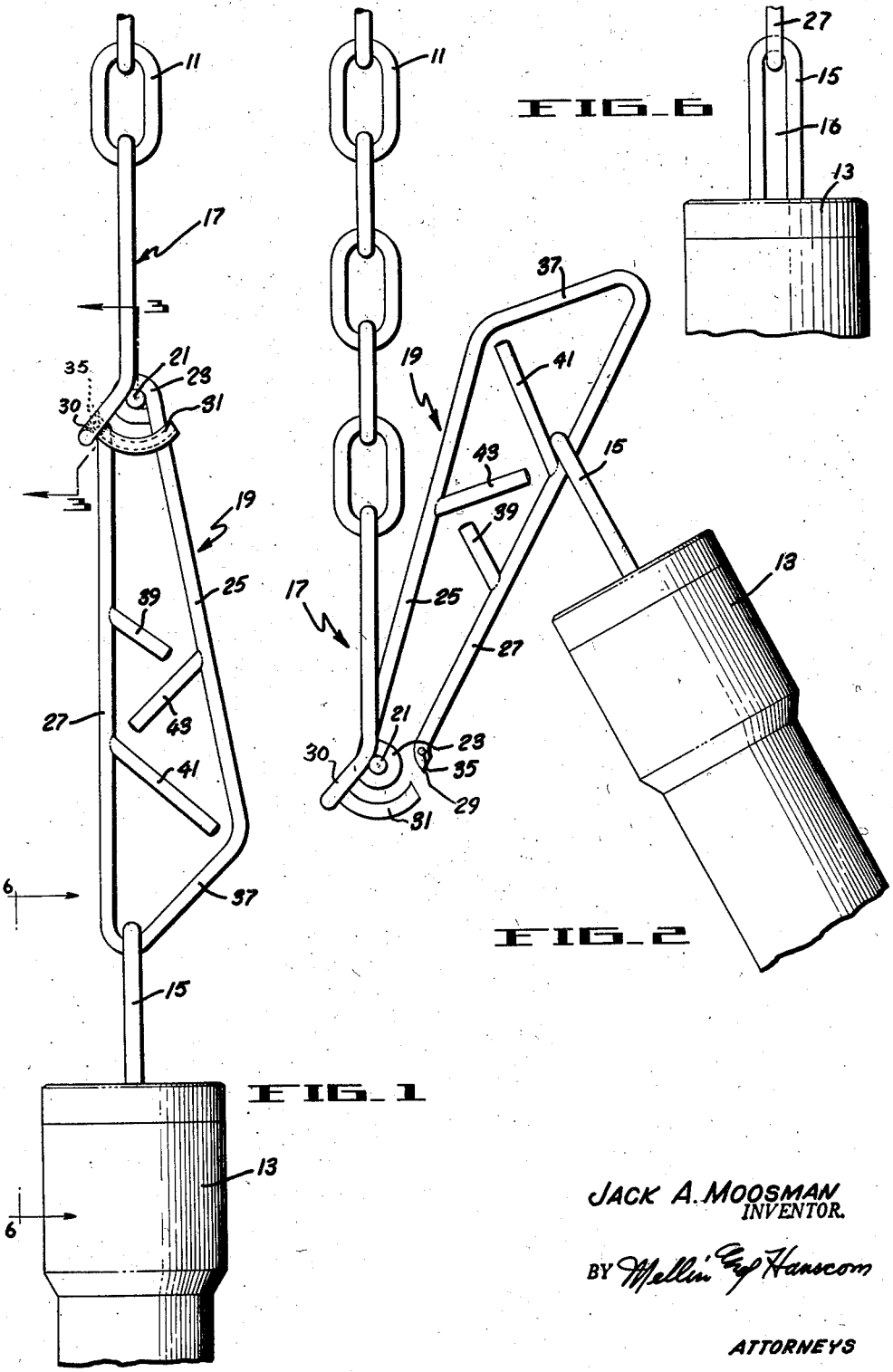
JACK A. MOOSMAN
INVENTOR.
BY *Mellin & Hanscom*
ATTORNEYS

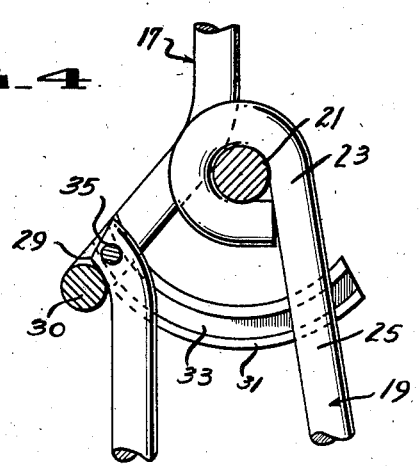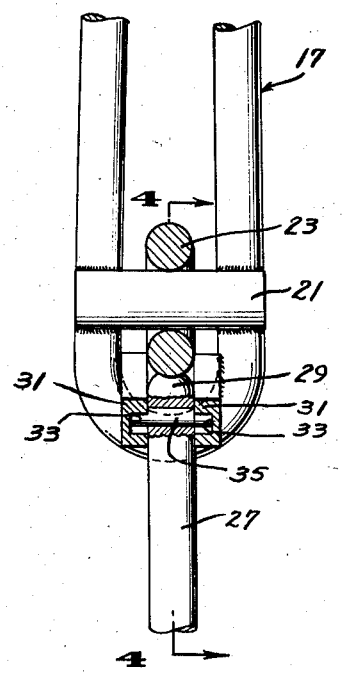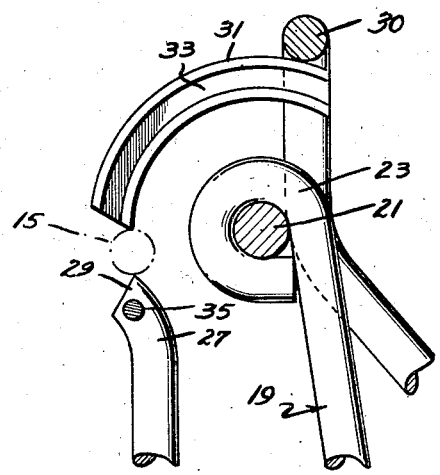

United States Patent Office 2,821,766
Patented Feb. 4, 1958

2,821,766

SAFETY CATCH

Jack A. Moosman, Glendale, Calif., assignor, by mesne assignments, to Johnston Testers, Inc., Houston, Tex., a corporation of Texas Application May 7, 1953, Serial No. 353,642

1 Claim. (Cl. 24—242)

This invention relates to safety catches for releasably engaging and safely supporting a heavy article in an overhead position, as upon an oil derrick or other super structure above an area frequented by workmen where an inadvertent release of the object might cause serious injury to workmen or to nearby equipment.

A main object of the present invention is to provide a safety catch including two members pivotally connected together, one member being adapted to be suspended from a line, and the other member having a gap adapted to admit an eye attached to the object to be suspended, wherein the first member is provided with a mechanism operable to close the gap of the second member when the members are suspended from the line and assume a position of gravitational equilibrium under the influence of the weight of the various parts.

Another object of the present invention is to provide a device as above described so designed that, when the members are swung from their position of gravitational equilibrium, the mechanism opens the gap to permit the separation of the object and the lower member.

A further object of the present invention is to provide a catch having means for releasably holding the object and lower member against separation, even when the members are swung away from their position of gravitational equilibrium, which means provides a tortuous path permitting the object to be released by proper manipulation.

Various other objects of the present invention will be apparent from the following description taken in connection with the accompanying drawings, wherein:

Fig. 1 is a front elevational view of a safety catch embodying the concepts of the present invention suspended from a line and supporting an object, the parts being shown in a position of gravitational equilibrium.

Fig. 2 is a view similar to Fig. 1, but showing the parts as having been displaced from their position of gravitational equilibrium.

Fig. 3 is an enlarged fragmentary view, partly in section, as viewed along line 3—3 of Fig. 1, showing the engagement of the lower member pin in the grooves of the upper member arcuate segments.

Fig. 4 is a fragmentary sectional view, the plane of the section being indicated by the line 4—4 of Fig. 3.

Fig. 5 is a view similar to Fig. 4, but showing the members as having been swung from their position of gravitational equilibrium to permit removal of the eye of the object being supported.

Fig. 6 is a partial side elevation of a safety catch such as shown in Fig. 1, the view being taken on line 6—6 of Fig. 1.

Referring to the accompanying drawings, wherein similar reference characters designate similar parts throughout, there is disclosed a safety catch embodying the concepts of the present invention suspended by a line 11, indicated in the form of a chain, but which may obviously be of any other conventional form, such as a cable. Suspended from the safety catch is an object 13, which may be any type of tool, structural part or equipment to be suspended over the heads of workmen. Object 13 is connected to the safety catch by means of an eye 15, attached to said object and releasably held by the safety catch in a manner to be presently explained. The safety catch includes an upper member 17 assuming the form of an elongated closed loop, and a lower member 19 assuming the form of an obtuse triangular loop open at its upper end. Members 17 and 19 are pivotally connected together by the provision of a pin 21 fixed to member 17 adjacent the lower end thereof and extending through an eye 23 formed on the upper end of the righthand leg 25 of lower member 19.

The lefthand leg 27 of lower member 19 has an outwardly protruding end portion 29, arranged to be embraced by the lower end portion 30 of upper member 17, said lower end 30 being angularly disposed relative to the length of member 17. Upper member 17 has fixed to its lower end 30 and extending laterally therefrom in a counterclockwise direction as the parts are depicted in Fig. 1, a pair of laterally spaced arcuate segments 31 provided with matching arcuate grooves 33 on their adjacent faces, slidably receiving a pin 35 fixed to the upper end of leg 27. The free ends of legs 25 and 27 are spaced to form a gap which is closed when the members are allowed to assume a position of gravitational equilibrium, by engagement of the pin 35 within grooves 33.

Legs 25 and 27 are joined at their lower ends by an angularly disposed section 37. The connecting section 37 is disposed angularly upward and outward with respect to the lower end of leg 27 in order that when the parts assume a position of gravitational equilibrium, the eye 15 will lie closely adjacent to the leg 27. Extending inwardly from leg 27 is a pair of spaced eye retaining elements 39 and 41, and extending inwardly from leg 25 is a single eye retaining element 43, said retaining elements increasing in length from the uppermost to the lowermost, as is clearly apparent from Fig. 1. All of the retaining elements are inclined in a direction away from the mount of member 19, and elements 39 and 41 extend in a direction generally at right angles to the direction of extension of element 43. The elements are so arranged that, if extended, element 39 would intersect element 43, element 43 would intersect element 41, and element 41 would intersect intermediate portion 37. As is apparent from Fig. 1, element 43 is arranged parallel to the section 37. Eye retaining elements 39, 41 and 43 define a tortuous path extending from the bottom of member 19 to the gap at the upper end of said member.

The eye 15 is formed with an elongated slot-like opening 16, as shown in Fig. 6. The width of the opening 16 is only slightly greater than the diameter of the legs 25 and 27 and connecting section 37. The length of the opening 16 is sufficient to permit the eye to extend over the leg 27 and the free end of the retainer 41 when presented thereto at a proper angle. The narrow width of the opening 16 necessitates that the eye 15 be disposed substantially in the same plane as the plane of the member 19 in order to pass the retainers 41, 43 and 39 for disengagement with the member 19.

The operation of the catch is as follows. As shown in Fig. 1, it is apparent that eye 15 engages the lower end portion of member 19, and that members 17 and 19 assume a position of gravitational equilibrium under the influence of their own weight and the weight of object 13, that is, the members 17 and 19 assume a substantially vertical inextensible position. To release object 13 from the catch, members 17 and 19 must be pivoted away from their position of gravitational equilibrium to the position shown in Fig. 5. During such movement pin 35 is moved out of engagement with grooves 33 and is thus freed from the arcuate segments 31. The offset lower end portion 30 of member 17 is swung away from end 29. This permits the member 19 to be manipulated so that eye 15 successively passes over eye retaining elements 41, 43 and 39, and out through the gap between the free ends of legs 25 and 27.

When an object is being raised or lowered it may strike an obstruction which acts to swing the parts out of gravitational equilibrium to a position such as shown in Fig. 2. Under such conditions, if it were not for the eye retaining elements 39, 41 and 43, the object could slip off from the obstruction and drop downwardly through the open gap between the free ends of legs 25 and 27. However, eye retaining elements 39, 41 and 43 prevent such accidental release, even while the parts are swung from their normal position of gravitational equilibrium.

By the present invention, a novel safety catch has been provided wherein the parts are permanently connected together and hence there are no separate parts which are apt to get lost or misplaced. At the same time, the device assures safety because even when the two main members are swung to their object releasing position, the eye retaining elements function to prevent an accidental release of the object.

While I have shown the preferred form of my invention it is to be understood that various changes may be made in its construction by those skilled in the art without departing from the spirit of the invention as defined in the appended claim.

Having thus described my invention, what I claim and desire to secure by Letters Patent is:

A safety catch of the class described comprising, an elongated continuous loop adapted to be connected to a chain or the like at one end and having an angularly disposed end portion at the other end, a pivot bar secured to opposite side portions of said angularly disposed end portion, an arcuate channel having said pivot bar as its center of curvature secured at one end thereof to said angularly disposed end portion, a discontinuous loop adapted to be releasably connected to an eye or the like and having first and second end portions separated to provide a gap, a pin on said first end portion for releasable engagement in said arcuate channel, means pivotally securing said second end portion to said pivot bar for pivotal movement of said discontinuous loop between a closed position with said pin engaged in said arcuate channel and a released position with said pin and said first end portion spaced from the other end of said arcuate channel, said first end portion abutting said angularly disposed end portion in said closed position to limit travel of said pin in said arcuate channel, and means on said discontinuous loop defining a tortuous path to prevent accidental release of the eye or the like.

References Cited in the file of this patent
UNITED STATES PATENTS

| | | |
|---|---|---|
| 205,402 | Marcellus | June 25, 1878 |
| 487,325 | Hayes | Dec. 6, 1892 |
| 862,197 | Pryor | Aug. 6, 1907 |
| 964,068 | Stridell | July 12, 1910 |
| 1,339,004 | Schmidt | May 4, 1920 |
| 1,956,786 | Bemis | May 1, 1934 |

FOREIGN PATENTS

| | | |
|---|---|---|
| 208,409 | Great Britain | Dec. 20, 1923 |